United States Patent [19]
Church

[11] Patent Number: 5,771,534
[45] Date of Patent: Jun. 30, 1998

[54] SLIDER BLOCK ASSEMBLY FOR A VEHICLE WINDOW

[75] Inventor: Claire Church, Washington Township, Macomb County, Mich.

[73] Assignee: Consolidated Industrial Corporation, Birmingham, Mich.

[21] Appl. No.: 514,064

[22] Filed: Aug. 11, 1995

[51] Int. Cl.[6] ........................................ F16D 1/00
[52] U.S. Cl. ........................... 16/93 R; 16/95 R; 49/351; 49/375; 49/428; 49/440
[58] Field of Search ................................ 16/90, 93 R, 93 D, 16/95 R; 49/350, 351, 352, 375, 440, 441, 428

[56] References Cited

U.S. PATENT DOCUMENTS

| | | |
|---|---|---|
| 1,502,644 | 7/1924 | Campbell . |
| 1,621,508 | 3/1927 | Holt . |
| 3,449,863 | 6/1969 | Koch ........................................ 49/428 |
| 3,466,802 | 9/1969 | Doveinis et al. . |
| 3,466,803 | 9/1969 | Packett . |
| 3,604,151 | 9/1971 | Ventre ...................................... 49/351 |
| 4,069,617 | 1/1978 | Koike . |
| 4,114,945 | 9/1978 | Lutz . |
| 4,400,026 | 8/1983 | Brown, Jr. . |
| 4,417,419 | 11/1983 | Rossie et al. .............................. 49/440 |
| 4,428,899 | 1/1984 | van Manen . |
| 4,633,613 | 1/1987 | Kobayashi et al. . |
| 4,706,412 | 11/1987 | Kobrehel .................................. 49/352 |
| 4,770,056 | 9/1988 | Becker et al. ............................ 49/352 |
| 4,825,594 | 5/1989 | Escaravage .............................. 49/351 |
| 4,829,630 | 5/1989 | Church et al. . |
| 4,882,805 | 11/1989 | Campbell et al. ...................... 16/93 R |
| 4,930,254 | 6/1990 | Valentin . |
| 4,935,986 | 6/1990 | Church et al. . |
| 5,009,035 | 4/1991 | Kuki et al. ............................... 49/352 |
| 5,036,621 | 8/1991 | Iwasaki . |
| 5,120,151 | 6/1992 | Farris et al. ............................. 430/24 |
| 5,195,211 | 3/1993 | Krajenke . |
| 5,392,494 | 2/1995 | Wronski . |

FOREIGN PATENT DOCUMENTS

| | | |
|---|---|---|
| 0310451 | 4/1989 | European Pat. Off. . |
| 3503547 | 5/1986 | Germany . |
| 3545224 | 7/1987 | Germany . |
| 6-137023 | 5/1994 | Japan ...................................... 49/375 |
| 1190350 | 5/1970 | United Kingdom . |

Primary Examiner—Daniel W. Howell
Assistant Examiner—Christopher Kirkman
Attorney, Agent, or Firm—Brooks & Kushman P.C.

[57] ABSTRACT

A slider block assembly and method for making the same are disclosed. The slider block assembly is for use with an elongate guide channel having a pair of laterally spaced apart side walls and a pair of axially spaced apart base walls joined to the side walls with one of the base walls having an elongate slot therein. The slider block assembly comprises a slider block having a socket therein and a fastener having a generally spherical ball. Preferably, the slider block is axi-symmetric having an annular side wall flange and an annular base flange extending from a main body. The side wall and base flanges are cooperatively biased against the side walls and base walls when the slider block is inserted in the guide channel to prevent the slider block from rattling therewithin while allowing the slider block to slide or roll within the guide channel. The slider block assembly is preferably made by molding, under heat and pressure, a slider block which includes a socket, maintaining the slider block above a predetermined elevated temperature, applying dry heat to the slider block if necessary, pressing the fastener into the socket while the slider block is above the elevated temperature, and then cooling the slider block assembly.

10 Claims, 2 Drawing Sheets

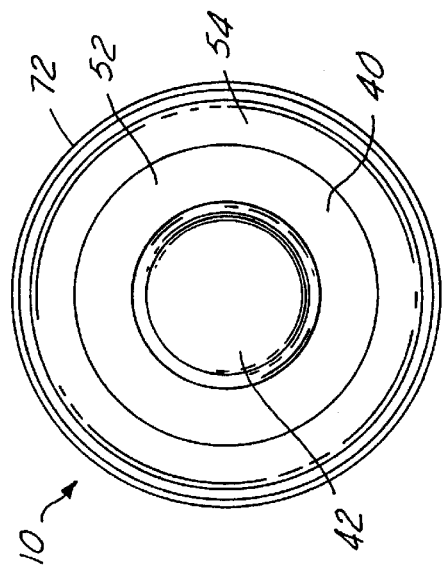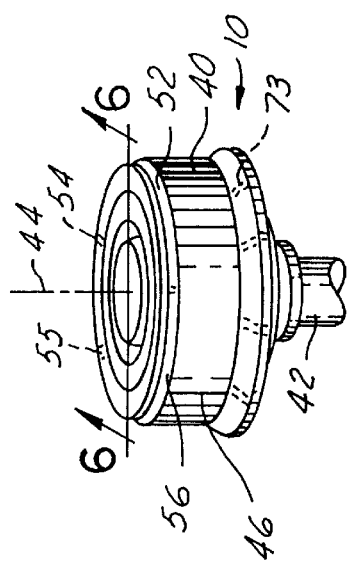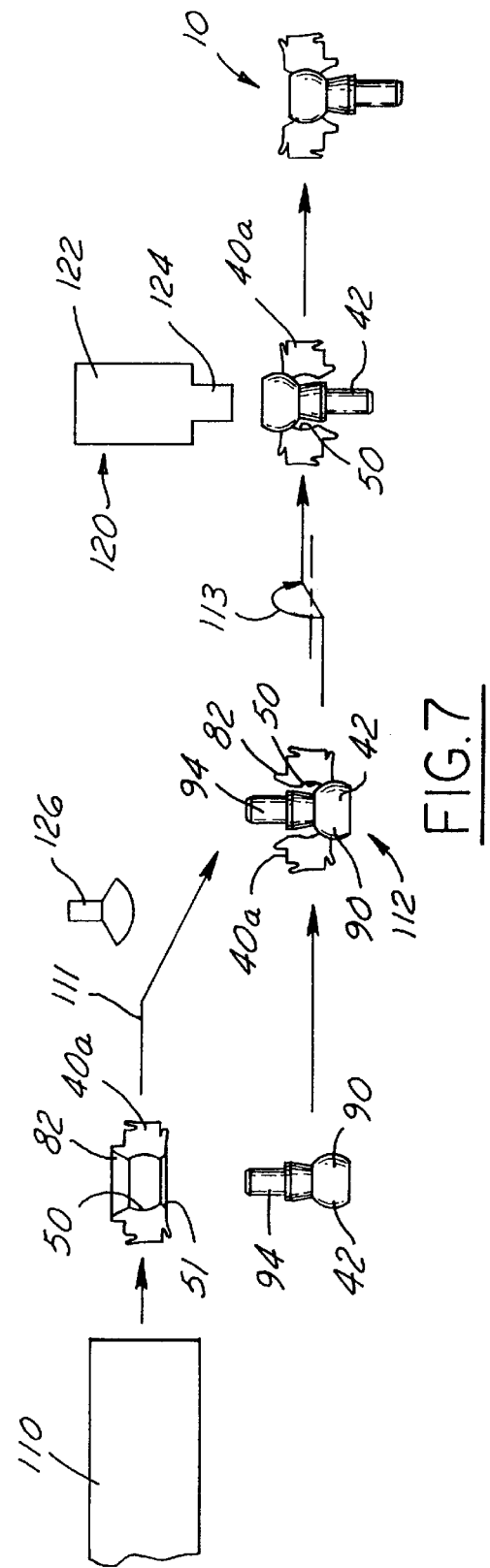

SLIDER BLOCK ASSEMBLY FOR A VEHICLE WINDOW

TECHNICAL FIELD

This invention relates to slider block assemblies, and methods for making the same, which support and guide vehicle windows allowing for the raising and lowering of the windows within vehicle doors.

BACKGROUND ART

A problem associated with vehicle windows is how to slidably mount the windows in vehicle doors while avoiding rattling noises. One solution to this problem is disclosed in U.S. Pat. No. 4,935,986, which is assigned to the assignee of the present application.

To overcome the noise problem, various slider block assemblies are disclosed. Each slider block assembly includes a rectangular slider block swivelably carrying a connector which affixes to a vehicle window. A pair of these slider block assemblies are slidably mounted in laterally spaced apart tracks. Projections on the slider blocks extend laterally and axially and are used to bias and hold the slider blocks snugly within the tracks. Meanwhile, the slider blocks can slide up and down within the tracks to raise and lower the vehicle window.

While these slider block designs are effective in limiting lateral and axial movement of the slider blocks within the tracks, the slider blocks are relatively complicated in configuration. These complicated configurations result in molds which are also complicated and expensive. Further, because of the complexity, holding tolerances on the slider blocks can be difficult.

Another disadvantage to using these particular slider blocks is that each slider block must be precisely installed in a track with its longitudinal axis coinciding with the longitudinal axis of the track. If this longitudinal alignment is not present, the slider block must be manipulated and realigned to allow the slider block to be inserted in its respective track.

Mounted within an aperture or socket in each slider block is a connector. The connector includes an enlarged ball and an elongate stem. The enlarged ball is retained within the socket which is partially spherical.

A problem exists as how to install the ball in the socket of the slider block without causing the socket to crack or fracture. Conventionally, the slider block, which is made of plastic, is soaked in a water bath. The slider block absorbs water and becomes more ductile. This allows the ball to be pressed into the socket without the slider block fracturing. The slider block is then allowed to dry out reducing the ductility of the slider block while raising the pull-out force necessary to withdraw the ball from the socket. A certain minimum pull-out force is required with slider block assemblies.

A particular problem with this method of making slider block assemblies is that it is time consuming. The slider blocks are typically soaked in a water bath for several hours to achieve the desired increased ductility. Then, after the connectors have been installed in the slider blocks, the slider blocks must be dried. Otherwise, excessive moisture can lead to the rusting of handling equipment used during the manufacturing process. Hence, this method of making slider blocks is quite time intensive. Further, many handling operations are required to make a slider block assembly using this water bath method, thus increasing the expense of making the slider block assemblies.

The present invention is designed to overcome the problems of complex molds, misalignment of slider blocks during assembly of vehicle windows and time intensive and expensive manufacturing methods for assembling the slider block assemblies.

SUMMARY OF THE INVENTION

A slider block assembly and method for making the same are disclosed. The slider block assembly is for use with an elongate guide channel having a pair of laterally spaced apart side walls and a pair of axially spaced apart base walls joined to the side walls with one of the base walls having an elongate slot therein. The slider block assembly includes a slider block and a fastener.

The slider block has a body and a peripherally extending side wall flange. The side wall flange attaches to the body and the body has a socket extending about a fastener axis. The fastener is secured within the socket for connecting a member to be guided, such a vehicle window. The side wall flange springingly engages the side walls when the slider block assembly is placed within the elongate guide channel with the fastener extending through the elongate slot. The slider block is thus inhibited from rattling laterally within the guide channel while permitting the slider block to slide within the guide channel.

The slider block may further include a base flange attached to the body which springingly engages one of the base walls when the slider block assembly is placed within the elongate guide channel to inhibit rattling axially within the guide channel.

Ideally, the side wall flange is peripherally continuous. However, it is also possible that the side wall flange may include a plurality of peripherally spaced slots therein such that the side wall flange is not peripherally continuous. Preferably, the slider block is axisymmetric about the fastener axis and the side wall flange and the base flange are annular.

Optimally, the body is annular and the side wall flange cooperates with the body to form an annular, axially opening channel therebetween. Similarly, the base flange and body are annular forming an annular, radially opening channel therebetween. Because the side wall flange is annular, the slider block can be inserted into the guide channel at at least three different angular orientations relative to the fastener axis. This would also be true if the periphery of the side flange wall were square but the alignment of the slider within the channel would not be automatic as it would be with the preferred embodiment. Also, if annular, the slider block can roll within the track as well as slide.

The method for making a slider block assembly comprises molding, with heat and pressure in a mold, a slider block including an aperture. The slider block is removed from the mold. A fastener is then pressed into the aperture while the slider block is above a predetermined elevated temperature to create the slider block assembly.

If the slider block cools too much between the molding step and the fastener in-pressing step, dry heat may be applied to the slider block to keep the slider block above the predetermined temperature. The dry heat may come from a radiant source such as a heat lamp. This method allows the fastener to be inserted into the aperture while the slider block has an increased ductility. Then, the slider block cools to an ambient temperature, decreasing the slider block ductility and increasing the force required to pull the fastener from the aperture.

It is an object of the present invention to make a slider block which is reduced in complexity of configuration relative to conventional slider blocks.

It is another object to provide a slider block which is more economical to manufacture than conventional slider blocks.

It is yet another object to provide a slider block which is annular in configuration.

A further object is to provide a slider block which can roll within a track.

An additional object is to provide a slider block having a side wall flange extending peripherally about an axis which can be inserted between a pair of side walls of a track at any angular orientation relative to the axis thus enhancing the ease of inserting the slider block into the track.

Still yet another object of the present invention is to provide a method for making a slider block wherein the slider block is maintained at an elevated temperature using dry heat such that a fastener can be inserted into a socket of the slider block without the slider block being permanently damaged.

These and other features, objects, and advantages of the present invention will become readily apparent from the following description, appended claims, and accompanying sheets of drawings.

BRIEF DESCRIPTION OF THE DRAWINGS

FIG. 4 is a perspective view of a slider block assembly utilized in FIG. 1;

FIG. 5 is an enlarged plan view of a slider block assembly;

FIG. 7 schematically illustrates a method of making a slider block assembly in accordance with this invention.

BEST MODE FOR CARRYING OUT THE INVENTION

Figure 1:
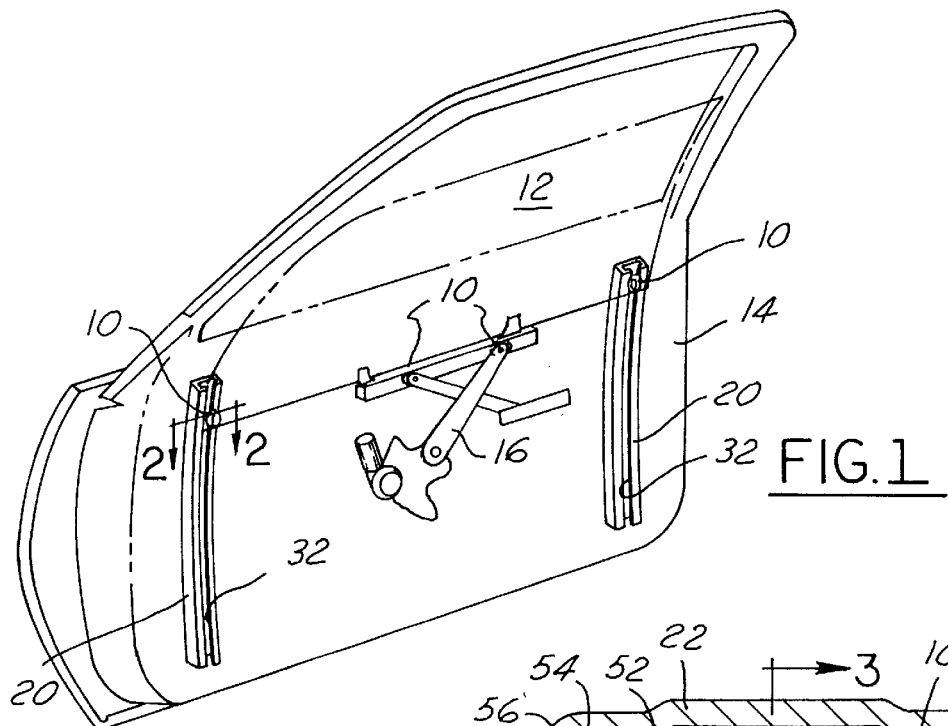
FIG. 1 is a perspective view of slider block assemblies, made in accordance with the present invention, which slidably mount a window in a vehicle door.

Slider block assemblies 10, made in accordance with the present invention, are shown in FIG. 1 supporting a window 12 in a vehicle door 14. A mechanism 16 of conventional construction is used for raising and lowering window 12 relative to door 14. Slider block assemblies 10 are respectively supported within a pair of laterally spaced-apart tracks 20 and a horizontal track 21. Track 21 has two slider block assemblies 10 which move horizontally together and apart to raise and lower window 14 as mechanism 16 scissors. As each of slider block assemblies 10 and tracks 20 and 21 are generally similar to one another, only one cooperating set including a slider block assembly 10 in a track 20 will be described.

Figure 2:
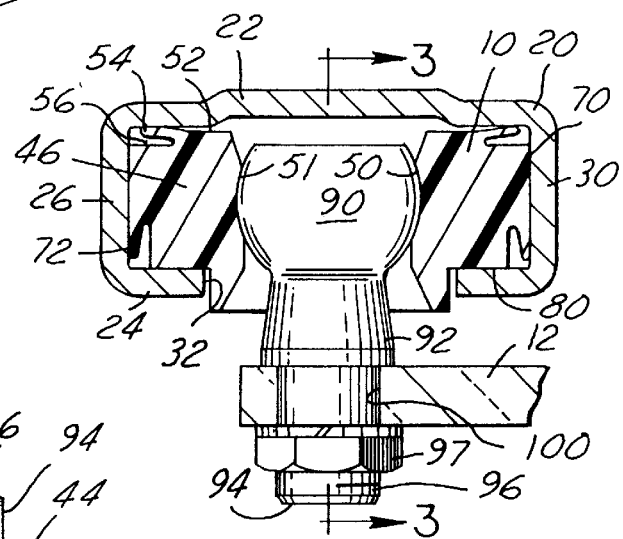
FIG. 2 is a fragmentary top sectional view, taken along line 2—2 of FIG. 1, illustrating a slider block assembly retaining a portion of the vehicle window.

Looking to FIG. 2, track 20 is generally C-shaped in configuration. Track 20 comprises a back base wall 22, a front base wall 24 and a pair of laterally spaced apart side walls 26 and 30. Front base wall 24 has an elongate vertical slot 32 formed therein through which a portion of slider block assembly 10 protrudes.

Referring now to FIGS. 2–6, slider block assembly 10 includes a slider block 40 and a mounting rod 42. Slider block 40 is generally axisymmetric about an axis 44. Slider block 40 includes a main body 46 having a partially spherical socket 50 located in the center thereof. Slider block 40 has an annular rear surface 52 from which a base flange 54 extends rearwardly and radially outwardly forming a radially opening channel 56 between base flange 54 and main body 46.

Figure 6:
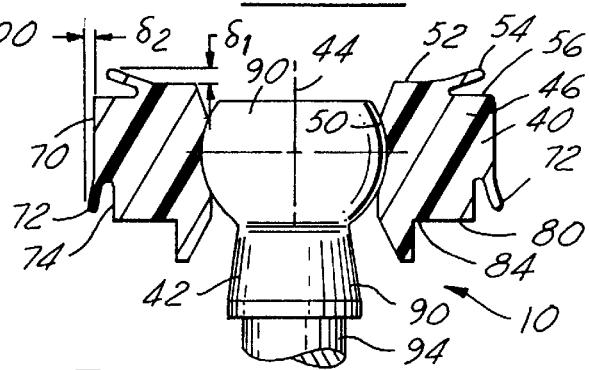
FIG. 6 is a sectional view taken along line 6—6 of FIG. 4.

In a free state, as shown in FIG. 6, rear flange 54 is disposed rearwardly from rear surface 52 by a distance $\delta_1$. Main body 46 has a circumferential outer surface 70 from which an axially forwardly and radially outwardly extending side wall flange 72 protrudes. Side wall flange 72 extends radially outwardly beyond outer circumferential surface 70 by a distance $\delta_2$. An annular axially opening channel 74 is formed between main body 46 and side wall flange 72. Located on the forward portion of main body 46 is an annular forward surface 80 with a forwardly extending flange 82 extending therefrom forming an annular shoulder 84. Note in FIG. 4 that, although not preferred, flanges 54 and 72 may have peripherally spaced apart slots 55 and 73 which are shown in dashed lines.

Figure 3:
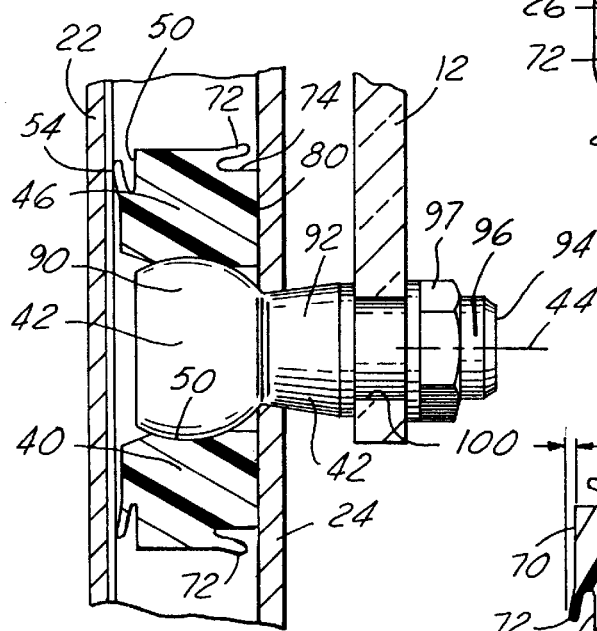
FIG. 3 is a fragmentary side sectional view, taken along line 3—3 of FIG. 2.

Fastener or mounting rod 42 includes a truncated spherical ball 90, a frustoconical collar 92, and a stem 94. As best seen in FIGS. 2 and 3, stem 94 has a threaded end 96. A nut 97 threadedly secures onto threaded end 96. Ball 90 of mounting rod 42 is clampingly retained within socket 50 of slider block 40.

Looking to FIG. 1, a slider block assembly 10 is inserted into an end of a track 20 or 21 between side walls 26 and 30 and in front of back base wall 22. Collar 92 of mounting rod 42 extends through slot 32. FIG. 2 shows side wall flange 72 is biased against side walls 26 and 30 which prevents slider block 40 from rattling laterally within track 20. Similarly, rear base flange 54 is biased against back base wall 22 while front surface 80 of slider block 40 presses against front wall 24. Accordingly, slider block assembly 10 is free to move along tracks 20 or 21 while being restrained from movement laterally or side-to-side and axially or front-to-back by the biasing provided by base flange 54 and side wall flange 72. These flanges 54 and 72 thus are maintained in continuous contact with opposed surfaces of tracks 20 or 21 to prevent rattling therein.

Window 12 has an aperture 100 therein through which stem 94 of mounting rod 42 extends. Window 12 is clamped between collar 92 and retaining nut 97. Other fastening techniques may be employed such as spin riveting to secure stem 94 to window 12. Similarly, window 12 is supported on the other side of vehicle door 14 by the other slider block assembly 10 and track 20. The operating mechanism includes two slide block assemblies 10 within track 21. Track 21 is secured to the lower portion of window 12.

FIG. 7 schematically illustrates a method of making a slider block assembly 10, or more specifically, the preferred method of assembling the fastener or mounting rod 42 in a slider block 40. Slider block 40 is first molded in an injection molding machine 110 using heat and pressure. From molding machine 110, the heated slider block, indicated as 40a, is transported by a conventional conveyor and vibratory alignment system schematically indicated by the arrow 111. System 111 orientates and transports slider block 40a with flange 82 uppermost to a location where it is dropped down over the upstanding stem 94 of fastener or mounting rod 42 as shown at position 112. At such a position, slider block 40a is resting upon ball 90. Slider block 40a at this time is at an elevated temperature, preferably above 100° F. because it is fresh from molding machine 110. Because socket 50 of slider block 40a at its intersection with bevelled surface 51 has a diameter less than the diameter of the ball 90, slider block 40*a* simply sits on the ball surface. While in this loosely assembled condition, mounting rod 42 and slider block 40*a* enter a looped portion of the conveyer schematically indicated by arrow 113, where slider block 40*a* and mounting rod 42 are inverted. In such inverted condition the heated slider block 40*a* and mounting rod 42 enter a mounting press 120 where mounting rod 42 is pressed by a pusher 122, having a nose 124, downwardly into socket 50 of slider block 40*a*.

While being transported across conveyor 111, each slider block 40*a* is kept at an elevated temperature, preferably 100° F. or above. If necessary, heat is supplied by a heating source such as a radiant heating lamp 126 to maintain the material of the slider block 40*a* at the elevated temperature. Preferably, slider block 40 is made of a material such as nylon or acetal.

Because slider block 40*a* is held at an elevated temperature, the ductility of the slider block 40*a* is also increased. Further, socket 50 has not yet fully cooled and contracted in size. This allows ball 90 to be inserted without fracturing or causing microcracks to be formed in slider block 40 during the insertion process. Slider block 40*a* is then allowed to cool which increases the rigidity of cooled slider block 40. Also, the diameter of socket 50 is believed to contract as slider block 40*a* cools.

While the foregoing specification has been described in relation to a certain preferred embodiment thereof, and many details have been set forth for the purpose of illustration, it will be apparent to those skilled in the art that the invention is susceptible to alteration and that certain of the details described herein can vary considerably without departing from the basic principles of the invention.

For example, the side wall flange need not be annular. The periphery of the side wall flange could be square or otherwise polygonal with the overall lateral width of the slider block being generally uniform. Although not as desirable as an annular outer periphery, these peripheries would allow the slider block to be inserted in a track at a variety of angular orientations relative to the fastener axis without the slider block binding in the track. Further, although not preferred, the side wall flange could have slots therein, as shown in FIG. 4, rather than being peripherally continuous.

What is claimed is:

1. A slider block assembly for use with an elongate guide channel having a pair of laterally spaced apart side walls and a pair of axially spaced apart base walls joined to the side walls with one of the base walls having an elongate slot therein, the slider block assembly comprising:

a slider block having an annular body with a central socket extending about a fastener axis;

a fastener secured within the socket for connecting a member to be guided;

said body having a peripherally extending resilient annular side wall flange projecting generally radially of the body to bear springing against the side walls of the guide channel when the slider block is disposed therein and prevent lateral rattling movement within the channel; and said body having a peripherally extending resilient annular base wall flange projecting generally axially of the body to bear springing against a rear wall of the guide channel when the slider block is disposed therein and prevent axial rattling movement within the channel.

2. The slider block assembly of claim 1 wherein:

the side wall flange is peripherally continuous.

3. The slider block assembly of claim 1 wherein:

the side wall flange includes a plurality of peripherally spaced apart slots therein such that the side wall flange is not peripherally continuous.

4. The slider block assembly of claim 1 wherein:

the body is annular and the side wall flange cooperates with the body to form an annular gap therebetween.

5. The slider block assembly of claim 1 wherein:

the body is annular and the side wall flange cooperates with the body to form an annular, axially opening channel therebetween.

6. The slider block assembly of claim 1 wherein:

the slider block is axisymmetric about the fastener axis.

7. The slider block assembly of claim 1 wherein:

the slider block can be inserted into the guide channel at at least three different angular orientations relative to the fastener axis.

8. The slider block assembly of claim 1 further comprising:

a circumferentially extending collar which extends axially from the body and extends through the elongate slot of the guide channel when the slider block assembly is placed in the guide channel.

9. The slider block assembly of claim 1 wherein:

is an annular and an annular gap between the base flange and the body.

10. The slider block assembly of claim 1 wherein:

the base flange flares radially outwardly from the body.

\* \* \* \* \*

UNITED STATES PATENT AND TRADEMARK OFFICE
CERTIFICATE OF CORRECTION

PATENT NO. : 5,771,534
DATED : June 30, 1998
INVENTOR(S) : Claire Church

It is certified that error appears in the above-identified patent and that said Letters Patent is hereby corrected as shown below:

In Claim 1, column 6, line 7, please delete "springing" and insert therein the word -- springingly --.

In Claim 1, column 6, line 13, please delete "springing" and insert therein the word -- springingly --.

Signed and Sealed this

Twelfth Day of January, 1999

Attest:

Attesting Officer

*Acting Commissioner of Patents and Trademarks*